(12) United States Patent
Cho

(10) Patent No.: US 6,235,424 B1
(45) Date of Patent: May 22, 2001

(54) CAP ASSEMBLY FOR SECONDARY BATTERY AND METHOD FOR ASSEMBLING THE SAME

(75) Inventor: Sung-Jae Cho, Kyonggi-do (KR)

(73) Assignee: Samsung Display Devices, Co., Ltd. (KR)

( * ) Notice: Subject to any disclaimer, the term of this patent is extended or adjusted under 35 U.S.C. 154(b) by 0 days.

(21) Appl. No.: 09/307,936

(22) Filed: May 10, 1999

(30) Foreign Application Priority Data

Sep. 22, 1998 (KR) .................................................. 98-39178

(51) Int. Cl.[7] .............................. H01M 2/04; H01M 2/00; H01M 2/12
(52) U.S. Cl. ......................... 429/175; 429/163; 429/185; 429/53; 429/55; 429/56; 429/7
(58) Field of Search .................................... 429/163, 175, 429/7, 94, 185, 170, 53, 54, 55, 56, 174, 171

(56) References Cited

U.S. PATENT DOCUMENTS 5,500,026 * 3/1996 Heller et al. ........................ 29/623.1
5,876,868 * 3/1999 Tanida et al. .......................... 429/56

\* cited by examiner

*Primary Examiner*—Carol Chaney
*Assistant Examiner*—Angela J. Martin
(74) *Attorney, Agent, or Firm*—Baker & McKenzie

(57) ABSTRACT

A cap assembly for a battery having a can filled with an electrolyte and an electrode assembly. The cap assembly is close-tightly mounted on the upper end of the can with a gasket interposed between the cap assembly and the upper end. The cap assembly comprises a safety plate whose edge extended at the right angle with respect to the plane of the safety plate, a cap cover disposed on the safety plate, a circuit breaker disposed under the safety plate, and an insulator disposed between the safety plate and the circuit breaker. The safety plate is provided with a first flange in which the insulator is tightly fitted, and the insulator is provided with a second flange in which the circuit breaker is tightly inserted.

5 Claims, 4 Drawing Sheets

CAP ASSEMBLY FOR SECONDARY BATTERY AND METHOD FOR ASSEMBLING THE SAME

BACKGROUND OF THE INVENTION

1. Field of the Invention

The present invention relates to a secondary battery and, more particularly, to a cap assembly for a secondary battery, which can prevent electrolyte from leaking out of the battery while providing safety and reliability of the battery.

2. Description of the Prior Art

Generally, the Li-ion battery uses lithium metal oxide as a positive active material and carbon or a carbon compound as a negative active material. Lithium salt dissolved in an organic solvent is used as the electrolyte via which the lithium ions move between positive and negative electrodes. Charging and discharging operations are realized while the lithium ions are moved between positive and negative electrodes.

FIG. 4 shows a cap assembly of a conventional Li-ion battery.

A cap assembly 6 is insulated from the can 4 by a gasket 8. That is, the upper end of the can 4 is crimped on the outer periphery of the cap assembly 6 with the gasket 8 interposed therebetween.

The cap assembly 6 comprises a safety plate 14 provided with a safety groove, a current control member 12 disposed on the safety plate 14, and a cap cover 10 disposed on the current control member 12. Attached under the safety plate 14 is a circuit breaker 18 with an insulator 16 disposed therebetween. The circuit breaker 18 is welded on a positive tab 20 so that it is coupled to a positive electrode of the electrode assembly 2.

In the conventional Li-ion battery structured as in the above, as the circuit breaker 18 is welded to the safety plate 14 with the insulator 16 interposed therebetween, the structure of the cap assembly is complicated. In addition, since the circuit breaker 18 and the insulator 16 are supported by the safety plate 14, the safety plate 14 may become deformed, causing the safety plate 14 and the circuit breaker 18 to malfunction.

Particularly, in the case of a cylindrical Li-ion battery, airtightness depends on a contacting area between the safety plate 14 and the gasket 8. However, in the conventional battery, an insufficient contacting area is obtained, negatively affecting airtightness.

SUMMARY OF THE INVENTION

Therefore, the present invention has been made in an effort to solve the above described problems.

It is an objective of the present invention to provide a cap assembly for a secondary battery, in which the assembling structure of a safety plate, an insulator, and a circuit breaker is improved so as to increase safety, reliability, and a seal effect of the battery.

To achieve the above objective, the present invention provides a cap assembly for a battery having a can filled with an electrolyte and an electrode assembly, the cap assembly being close-tightly mounted on the upper end of the can with a gasket interposed between the cap assembly and the upper end.

The cap assembly comprises a safety plate whose edge extended at the right angle with respect to the plane of the safety plate, a cap cover disposed on the safety plate, a circuit breaker disposed under the safety plate, and an insulator disposed between the safety plate and the circuit breaker.

The safety plate is provided with a first flange in which the insulator is tightly fitted, and the insulator is provided with a second flange in which the circuit breaker is tightly inserted.

The cap assembly may further comprises a current control member disposed between the cap cover and the safety plate.

According to a feature of the present invention, the gasket is made of an identical material as the insulator.

According to another feature of the present invention, the first and second flanges are forced inwardly such that the first and second flanges are inclined at a predetermined angle with respect to the longitudinal axis of the battery.

According to another aspect of the present invention, a method for assembling a cap assembly for a battery comprises the steps of preparing flange portions on a safety plate and an insulator, forcedly fitting the insulator and a circuit breaker into the flange portions of the safety plate and the insulator, respectively, mounting the safety plate and the insulator on the upper end of a can with a gasket disposed therebetween, mounting a cap cover on the safety plate, and crimping the upper end of the can on the cap assembly.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENT

Reference will now be made in detail to the present preferred embodiment of the invention, an example of which is illustrated in the accompanying drawings. Wherever possible, the same reference numbers will be used throughout the drawings to refer the same or like parts.

Figure 1:
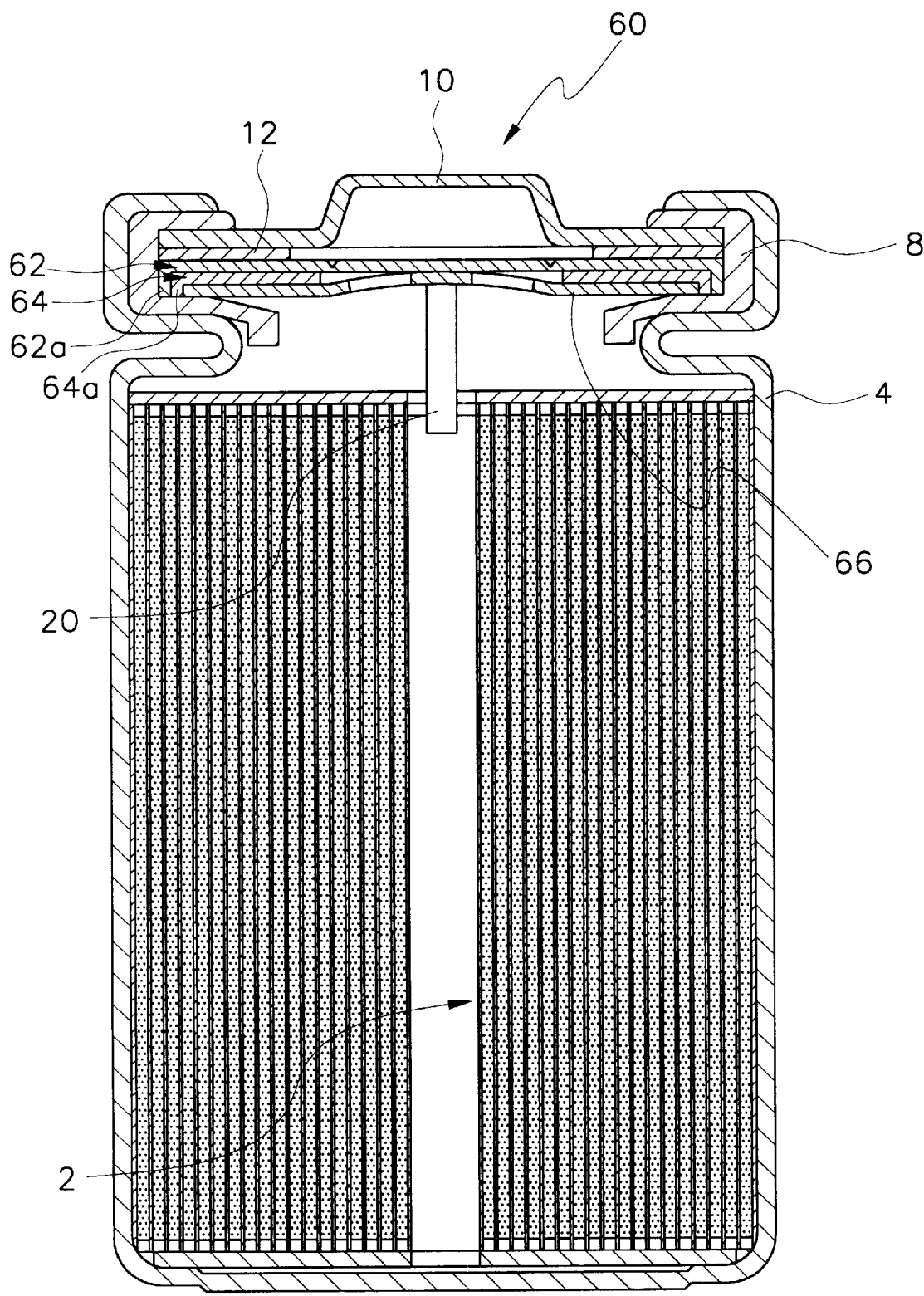
FIG. 1 is a partial sectional view illustrating a secondary battery where a cap assembly according to a preferred embodiment of the present invention is employed.

Referring first to FIG. 1, there is shown a cap assembly for a battery according to a preferred embodiment of the present invention.

An inventive cap assembly 60 is insulated from the can 4 by a gasket 8. That is, the upper end of the can 4 is crimped on the outer periphery of the cap assembly 60 with the gasket 8 interposed therebetween.

The cap assembly 60 comprises a safety plate 62 whose edge extended at the right angle with respect to the plane of the safety plate, a current control member 12 disposed on the safety plate 62, and a cap cover 10 disposed on the current control member 12. Disposed under the safety plate 62 is a circuit breaker 66 with an insulator 64 disposed therebetween.

The safety plate 62 is downwardly bent at its periphery to define a flange portion 62a. The insulator 64 is forced to be fitted inside the flange portion 62a of the safety plate 62. The insulator 64 is also downwardly bent at its periphery to define a flange portion 64a, and the circuit breaker 66 is forced to be fitted inside the flange portion 64a.

Figure 2:
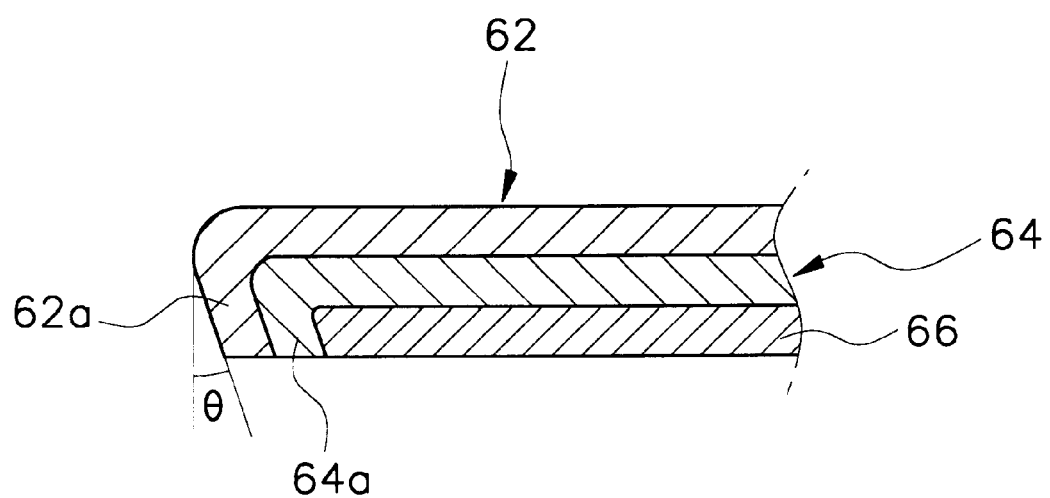
FIG. 2 is an enlarged view of a major portion of the cap assembly depicted in FIG. 1.
Figure 3:
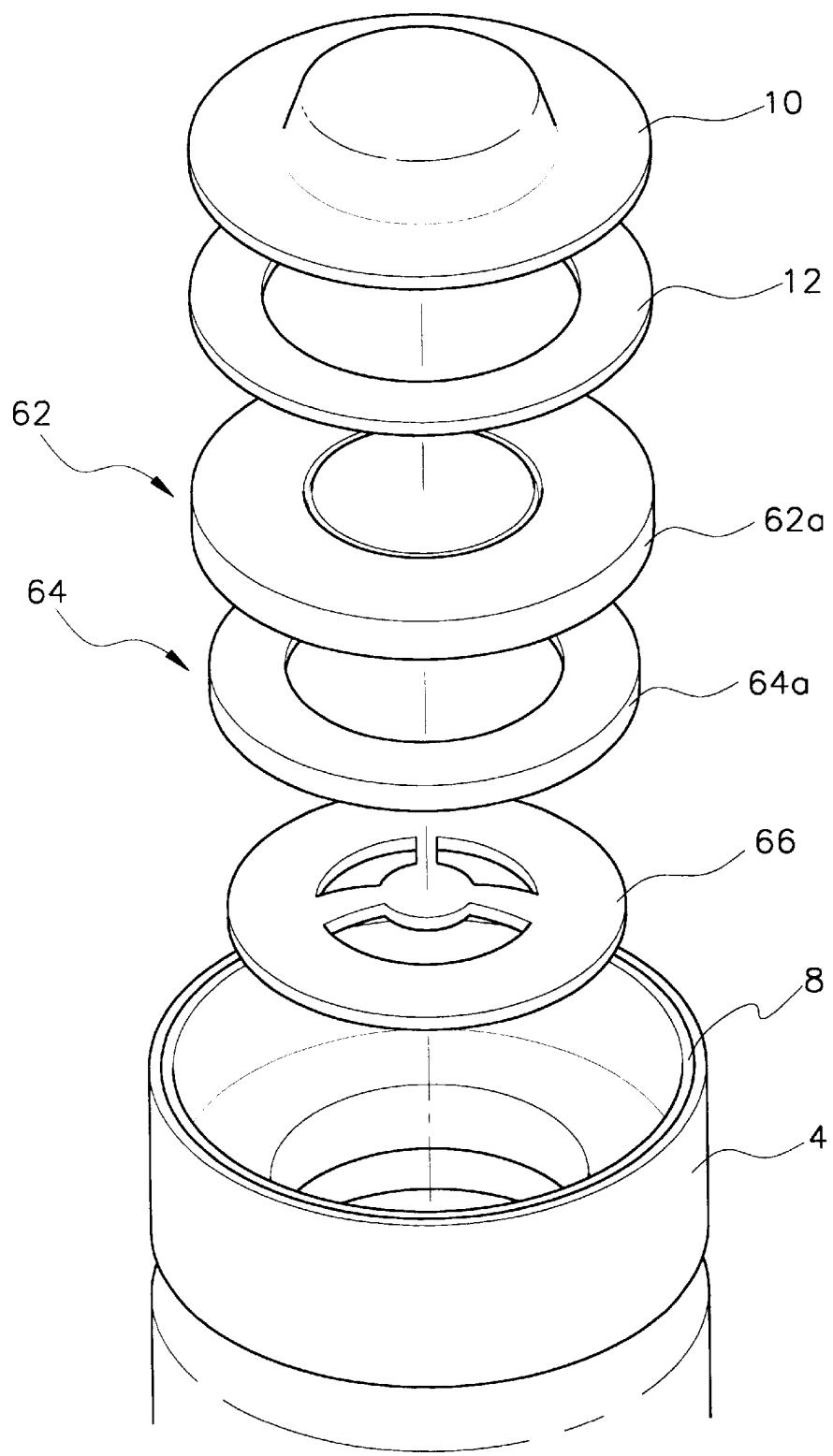
FIG. 3 is an exploded perspective view of the secondary battery according to a preferred embodiment of the present invention.
Figure 4:
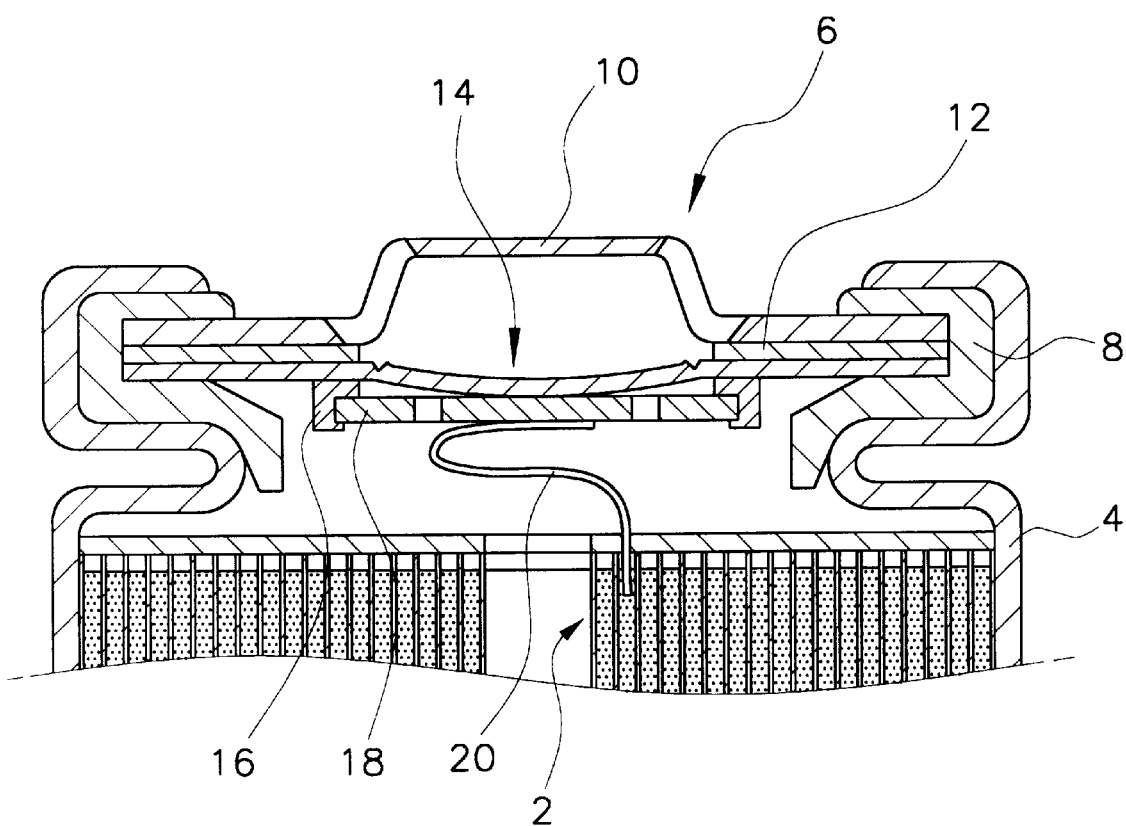
FIG. 4 is a sectional view of a cap assembly of a conventional battery.

Describing more in detail with reference to FIGS. 2 and 3, the safety plate 62 and the insulator 64 is bent downward to form the flange portions 62a and 64a, respectively. The flange portions 62a and 64a are forced inwardly such that they have an angle of 3–7° with respect to the longitudinal axis of the battery.

The insulator 64 is forcedly fitted into the flange portion 62a of the safety plate 62, then the circuit breaker 66 is also forcedly fitted into the flange portion 64a, whereby the safety plate 62, the insulator 64 and the circuit breaker 66 are securely fixed to each other to prevent the safety plate 62 from deforming.

In addition, the lower end of the flange portion 64a of the insulator 64 directly contacts the gasket 8, improving the seal effect. Particularly, if the insulator 64 is made of an identical material as the gasket, the seal effect can be further improved.

In addition, the flange portions 62a and 64a of the safety plate 62 and the insulator 64 enlarge a contacting area between the cap assembly and the gasket 8, thereby further enhancing the seal effect of the battery.

Referring to FIG. 3, there is shown a method for assembling a cap assembly for a battery according to a preferred embodiment of the present invention.

A method for assembling a cap assembly for a battery comprises the steps of preparing flange portions 62a and 64a on a safety plate 62 and an insulator 64 by pressing, forcedly fitting the insulator 64 and a circuit breaker 66 into the flange portions 62a and 64a of the safety plate 62 and the insulator 64, respectively, mounting the safety plate 62 and the insulator 64 on the upper end of a can 4 with a gasket 8 disposed therebetween, mounting a current control member 12 and a cap cover 10 on the safety plate 62, and crimping the upper end of the can 4 on the cap assembly 60.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A cap assembly for a battery having a can filled with an electrolyte and an electrode assembly, the cap assembly being close-tightly mounted on the upper end of the can with a gasket interposed between the cap assembly and the upper end, said cap assembly comprising:

a safety plate whose edge extends at a substantially right angle with respect to the plane of the safety plate;

a cap cover disposed on the safety plate;

a circuit breaker disposed under the safety plate; and an insulator disposed between the safety plate and the circuit breaker, wherein the safety plate is provided with a first flange in which the insulator is tightly fitted, and the insulator is provided with a second flange in which the circuit breaker is tightly inserted.

2. The cap assembly of claim 1 further comprising a current control member disposed between the cap cover and the safety plate.

3. The cap assembly of claim 1 wherein the gasket is made of an identical material as the insulator.

4. The cap assembly of claim 1 wherein the first and second flanges are forced inwardly such that the first and second flanges are inclined at a predetermined angle with respect to the longitudinal axis of the battery.

5. A cap assembly for a battery having a can filled with an electrolyte and an electrode assembly, the cap assembly being close-tightly mounted on the upper end of the can with a gasket interposed between the cap assembly and the upper end of the can, the cap assembly comprising:

a safety plate having an edge, the edge extending at a substantially right angle with respect to the plane of the safety plate and forming a first flange;

a cap cover disposed on the safety plate;

a circuit breaker disposed under the safety plate; and an insulator disposed between the safety plate and the circuit breaker, the insulator being tightly fitted within the first flange of the safety plate, the insulator including a second flange in which the circuit breaker is tightly inserted.

* * * * *